Feb. 25, 1936.  F. D. FUNSTON  2,032,124

SHOCK ABSORBER

Filed Aug. 22, 1934

INVENTOR
FREDERICK D. FUNSTON
BY
ATTORNEYS

Patented Feb. 25, 1936

2,032,124

UNITED STATES PATENT OFFICE 2,032,124

SHOCK ABSORBER

Frederick D. Funston, Dayton, Ohio, assignor to General Motors Corporation, Detroit, Mich., a corporation of Delaware Application August 22, 1934, Serial No. 740,948

15 Claims. (Cl. 188—88)

This invention relates to improvements in hydraulic shock absorbers.

It is among the objects of the present invention to provide a hydraulic shock absorber capable of being adjusted automatically to vary its resistance to relative movements between the frame and axle of a vehicle in response to and proportionately with accelerations in the vertical movements of the frame.

A further object of the present invention is to provide a hydraulic shock absorber capable of being adjusted automatically proportionately with accelerations in the vertical movements of the shock absorber and manually to vary the effective control of the automatic adjusting means.

Further objects and advantages of the present invention may be apparent from the following description, reference being had to the accompanying drawing, wherein a preferred embodiment of one form of the present invention is clearly shown.

Figures 1, 2:
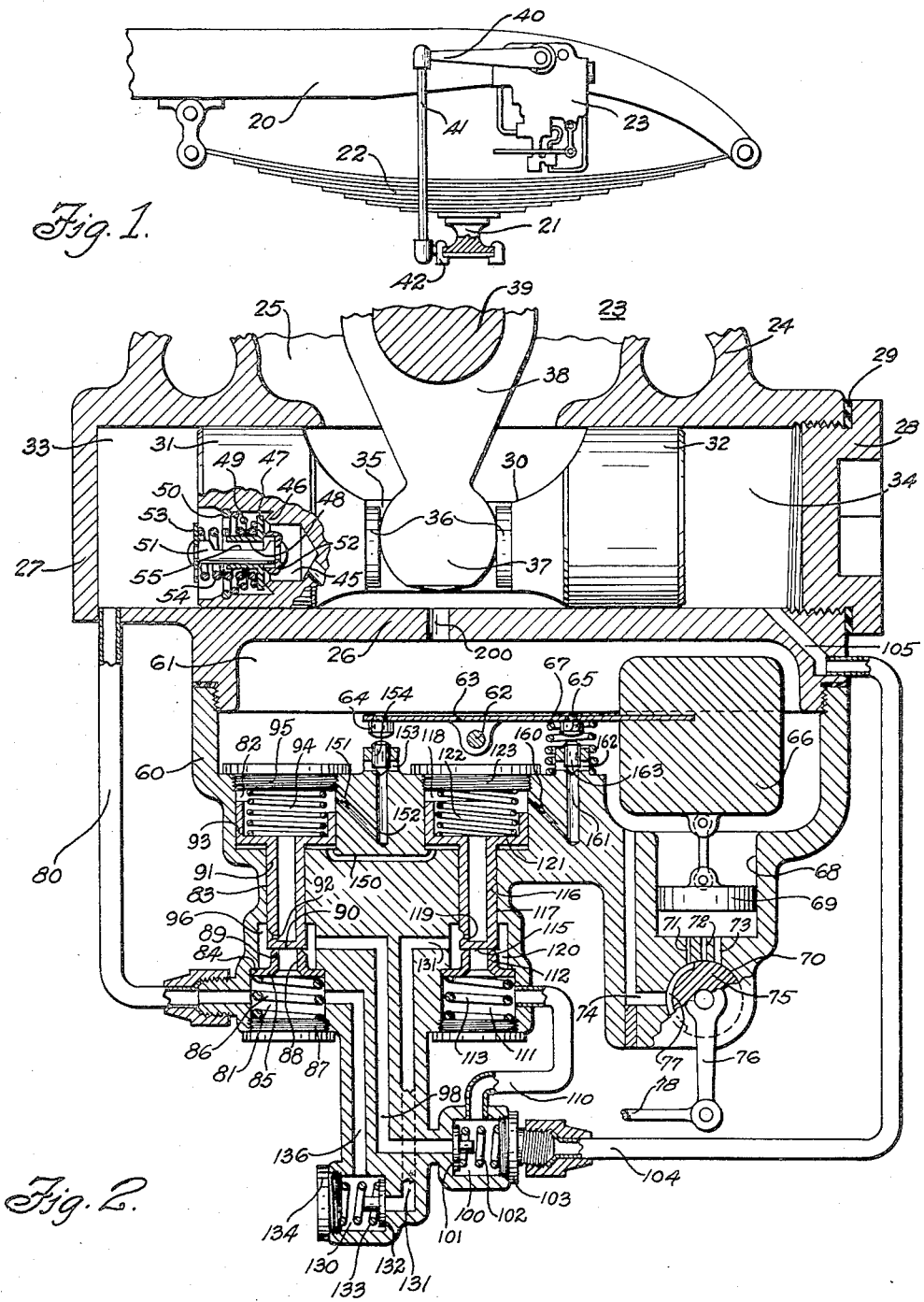
Fig. 1 is a fragmentary side view of a vehicle chassis, with wheels omitted, a shock absorber embodying the present invention being shown applied thereto.
Fig. 2 is a fragmentary sectional view of the shock absorber showing the various elements and their fluid and mechanical connections.

Referring to the drawing, the numeral 20 designates the frame of the vehicle which is supported upon the vehicle axle 21 by springs 22, only one being shown. The shock absorber designated as a whole by the numeral 23 comprises a casing 24, providing a fluid reservoir 25 and a cylinder 26. One end of this cylinder is shown closed by an integral wall 27, the other being provided with a cylinder head 28 threadedly received by the cylinder and having a gasket 29 to prevent fluid leaks at this end of the shock absorber.

Within the cylinder a piston 30 is slidably supported, said piston having oppositely disposed piston heads 31 and 32, the first forming what may be termed the "spring compression control chamber 33", the latter the "spring rebound control chamber 34". A space 35 is provided intermediate the piston heads 31 and 32, the end walls of this space having wearpieces 36. The free end 37 of the rotatable cam element 38 extends into the space 35 and engages the wearpieces 36. This rotatable cam element is attached to the operating shaft 39 of the shock absorber, which shaft is journalled in housing 24 transversely thereof, one end extending outside the shock absorber and having the shock absorber operating arm 40 secured thereto. The free end of this arm is swivelly secured to one end of a link 41, the opposite end of which is anchored to the axle 21 by the clamping member 42.

From this it may be seen that the axle 21 is operatively connected with the piston and any relative movements between the axle and the frame will cause reciprocation of the piston, the frame having the casing 24 attached thereto in any suitable manner.

Each piston head 31 and 32 is provided with a through-passage having fluid flow control devices therein, and inasmuch as both piston heads are similarly equipped, for the sake of brevity only one will be described detailedly.

The passage through the cylinder head 31 is designated by the numeral 45. In it there is provided an annular sharp edge ridge 46 forming a valve-seat for the intake valve 47, which valve has a tubular body portion 48. This valve is urged into yieldable engagement with the seat 46 by a spring 49, one end of which engages the valve, the other abutting against a ring-member 50 seated in a groove in the interior surface of the piston head passage. The tubular body portion 48 of the intake valve slidably supports the stem 51, which stem has the valve 52 in the form of a head attached at its one end, the opposite end having an abutment washer 53 secured thereto. A spring 54, interposed between the abutment washer 53 and the intake valve 47, yieldably urges the stem 51 so that its valve head 52 normally engages the outer end surface of the intake valve 47. A groove 55 in the stem 51 normally lies within the confines of the intake valve 47, but provides a fluid passage through said valve 47 when pressure moves the valve-head 52 from engagement therewith.

The aforedescribed fluid flow control device in each piston head operates as follows:

In response to the movement of the axle 21 toward the frame 20 the mechanical connections between the axle and the piston will cause said piston to be moved toward the left and consequently the fluid within the reservoir 25 will urge the intake valve 47 of the piston head 32 from its seat to establish a substantially free flow of fluid from the reservoir 25 through the piston passage 45 of piston head 32 into the spring rebound control chamber 34. This same movement of the piston will exert a pressure upon the fluid within the spring compression control chamber 33, which pressure, when attaining a predetermined degree, will move valve-head 52 from engagement with intake valve 47, against the effect of spring 54, to establish a restricted flow of fluid from chamber 33 through the slot 55 in the valve-stem 51 and past the valve-head 52 through the passage 45 of the piston head 31 into the reservoir 25. The tension of spring 54 is such that valve-head 52 will be moved from engagement with valve 47 only in response to a predetermined high pressure, other fluid flow control devices of the shock absorber, to be described, becoming effective to provide fluid flow control before such pressure is attained. It will of course be understood that upon the reverse movement of the piston, that is to the right as regards Fig. 2, which movement results when the axle 21 and frame 20 of the vehicle separate, the intake valve 47 of piston head 31 will be actuated to establish a substantially free flow of fluid into the spring compression control chamber 33, while the pressure exerted upon the fluid within the spring rebound control chamber 34 will, when attaining the proper degree, actuate the pressure release valve 52 of the piston head 32 to provide for a restricted flow of fluid from chamber 34 through the piston head 32 into the reservoir 25. Both these restricted flows through the piston heads 31 and 32 will resist piston movement and consequently the relative movements between the axle and frame of the vehicle will likewise be resisted.

The fluid flow control devices adapted to become effective before the fluid flow control devices of the piston 30 will now be described.

In Fig. 2 it is seen that, extension 60 is provided in the casing, being threadedly received thereby to permit assembly of parts. Between the main casing 24 and this casing extension 60 there is formed a chamber 61 in which a pivot pin 62 is provided upon which an arm 63 is pivotally supported. Equally spaced on each side of the pivot pin 62 and attached to the arm are contact blocks 64 and 65, whose functions will be described hereinafter. An inertia weight element 66 is rigidly secured to one end of the pivoted arm 63, this weight being held in suspension by a spring 67 interposed between the arm 63 and the casing portion 60. A recess 68 is provided in the casing portion 60, this recess forming the dashpot cylinder, the piston of the dashpot designated by the numeral 69 being slidably carried within said cylinder. Beneath this cylinder 68 the casing 60 has a cylindrical recess 70 which is in communication with the chamber in cylinder 68 beneath the piston 69 through three passages 71, 72, and 73, the passage 71 being the largest, the passage 73 being the smallest. The cylindrical opening 70 is in communication with the chamber 61 through a passage 74 provided in the casing. Communication between the passages 71, 72 and 73 and the passage 74 via the cylindrical opening 70 may be cut off by a plug 75 which is rotatably supported within the cylindrical opening 70 and which extends to the outside of the shock absorber and has the operating arm 76 attached thereto. In the peripheral surface of this plug 75 there is provided a groove 77 which is at all times in communication with the passage 74, but which may be moved into communication with either one, two, or all of the passages 73, 72, and 71, dependent upon the operation of the lever 76 secured to the plug 75. A link 78, connected to said lever 76, may lead to any suitable place in the vehicle whereby the operator of the vehicle may adjust the plug 75 from his position within the vehicle while it is in operation, to vary the control of the shock absorber over the frame and axle movements of the vehicle. This mechanism including the piston 69 and the manually operated valving plug 75 comprises the governor by which the shock absorber is adjusted to vary its control as stated.

A duct 80 leads from the spring compression control chamber 33 into a recess 81 formed in the casing extension 60. This recess is in communication with another recess 82 by a passage 83 of lesser diameter than either recess 81 or 82. Recess 81 has a smaller diameter portion 96, thus providing a shoulder 84 against which a valve-seat member 85 is urged by spring 86 which spring is interposed between said valve-seat member and a plug 87 threadedly received by the outer open end of recess 81. This valve-seat member 85 has a central tubular portion 88 presenting a sharp edge annular seat 89 which is engaged by the closed end 90 of the tubular valve-member 91 slidably carried in the passage 83. Adjacent the closed end 90 of the valve-stem 91 is a small orifice 92 which provides communication between the chamber 96 above the valve seat member 85 and the interior of the tubular valve stem 91. The tubular valve stem 91 has an enlarged head 93 slidably supported within the recess 82, said enlarged head 93 forming a piston reciprocative in the recess 82 and engaged by one end of a spring 94, the other end engaging the screw plug 95 threadedly received by the open end of the recess 82. Spring 94 normally urges the piston 93 and its valve stem 91 so that the closed end 90 of the valve stem is yieldably maintained in engagement with the annular sharp edge valve-seat 89. This normally shuts off communication between the two compartments formed in recess 81 on opposite sides of the valve-seat member 85.

Another recess is provided in the casing extension 60, this recess being designated by the numeral 100. It is in communication with the compartment 96 about the valve stem 91 through a passage 98. Normally this communication between compartment 96 and recess 100 is cut off by a check-valve 101 which is yieldably urged to shut off such communication by a spring 102 interposed between the valve 101 and a nipple plug 103 threadedly received by the open end of recess 100 and adjustable relatively to the casing 60 so as to permit changing of the tension of spring 102. To this nipple plug 103 a conduit 104 is attached which conduit leads to a passage 105 in the casing 24, said passage opening into the spring rebound control chamber 34.

A conduit 110 leads from the recess 100 on the discharge side of valve 101 to another recess 111, which is similar to recess 81. In this recess a valve-seat member having an annular valve seat 112, similar to the valve seat 89 of the valve seat member 85, is maintained in normal position by a spring 113. This valve seat 112 is engaged by the closed end 115 of the valve-stem 116, which valve-stem is slidably carried in the passage 117 leading from recess 111 to the recess 118. Valve stem 116 has an orifice 119 which provides communication between the compartment 120 surrounding the lower end of the valve-stem 116 and above the valve-seat member 112, and the interior of the valve-stem 116. Like valve-stem 91, valve stem 116 has an enlarged head portion 121 forming a piston slidably supported within the recess 118, one end of a spring 122 engaging the piston, the other end engaging the screw plug 123 threadedly received in the outer open end of the recess 118. The compartment 120 is in communication with a recess 130 through a passage 131, communication between the passage 131 and the recess 130 being normally shut off by a check-valve 132 urged into its normal position by spring 133 interposed between said valve and a screw plug 134 threadedly received in the outer open end of the recess 130. This recess 130 is also in communication with the recess 81 through a passage 136, and inasmuch as passage 81 is in communication with chamber 33 through the conduit 80, it may be said that recess 130 is also in communication with said chamber 33.

In order to eliminate a hydraulic lock beneath the valve pistons 93 and 121, a fluid passage 150 is provided connecting the two recesses 82 and 118 beneath said pistons.

The chamber in the recess 82 between the piston 93 and the screw plug 95 has a passage 151 leading therefrom communicating with a passage 152. This passage 152 terminates in a cross passage 153 and normally communication between passage 152 and this cross passage 153 is cut off by the gravity valve 154. This valve is in direct alignment with the contact block 64 on the pivoted lever 63. Similarly the space in recess 118 between piston 121 and plug 123 has a recess 160 leading therefrom into the passage 161, said passage 161 terminating in a cross passage 162. Communication between passage 161 and cross passage 162 is normally shut off by the gravity valve 163 which is in direct alignment with the contact block 65 also carried by the arm 63.

As has been mentioned heretofore, when the axle 21 approaches the frame 20, mechanical connections between the axle and the piston 30 moves the piston toward the lever past the piston head 31 to exert a pressure upon the fluid within the spring compression control chamber 33. This will force the fluid from said chamber through the conduit 80 and into the recess 81. From here the fluid flows through the valve seat member 85 against the closed end 90 of the valve member 91. When the pressure of this fluid flow is sufficient it will move the valve-stem 91 against the effect of the spring 94 to permit fluid to flow through the valve seat member 85 past the closed end 90 of the valve into the chamber 96 from where said fluid will flow into the passage 98 and engage and move valve 101 from its seat to establish a flow from passage 98 into the recess 101 from where the fluid will flow through conduit 104 and passage 105 into the spring rebound control chamber 34. Valve 101 has a predetermined spring load so that it restricts the fluid flow from the compartment 96 and thus creates a pressure therein which causes the fluid to flow from compartment 96 through the orifice 92 in the valve-stem 91 into the interior of said valve-stem and from there into the recess 82 above the piston 93. Normally this fluid will flow from recess 82 through passages 151 and 152, lifting the valve 154 against gravity and thus permitting the fluid to flow from passage 152 through the cross passage 153 into the chamber 61 which is in communication with the reservoir 25 by the passage 200 in casing 24. It will be seen that changing of the tension of spring 102 upon valve 101 will vary the restriction to the fluid flow from passage 98 into the recess 100 and consequently the pressure of this fluid in compartment 96 will be varied, similarly the pressure in the recess 82. Now, if the body carrying frame 20 should move downwardly at an accelerated rate, causing relative movement between the casing 24 and the inertia weight 66, said inertia weight 66 will cause the lever 63 to move about its pivot pin 62 in a counter-clockwise direction, resulting in the contact block 64 engaging valve 154 urging it downwardly toward the passage 152 to restrict the fluid flow from said passage into the cross passage 153. The flow from passage 152 being restricted will cause an increase in the pressure of the fluid within recess 82 and this pressure acting upon the enlarged piston 93 will move said piston downwardly in the recess 82, resulting in a downward movement of the valve-stem 91 and consequently a nearer approach of the closed end 90 thereof to the valve seat 89. This increases the restriction to the fluid flow through the valve-seat member 85 proportionately to the acceleration of the movement of the body carrying frame 20 downwardly and consequently the resistance to this downward movement of the frame 20 is increased proportionately to its acceleration.

On the other hand if the piston 30 is moved toward the right as a result of the separating movement between the frame and axle of the vehicle, the fluid in chamber 84 will be forced out of said chamber through the passage 105 and conduit 104 into chamber 100. From here the fluid will flow through passage 110 into recess 111 against the closed end 115 of the valve 116. This fluid pressure will move the valve against the effect of spring 122, resulting in a flow of fluid through the valve-seat member 112 into the compartment 120 thence through passage 131 against the valve 132 which will be moved from its seat to permit the fluid to flow into the recess 130. From here the fluid will flow through passage 136 into the recess 81 and then through conduit 80 into the spring compression control chamber 33. Like in the case of valve 101, valve 132 will create a pressure within compartment 120, this pressure build-up resulting in a flow of fluid from compartment 120 through the orifice 119 into the interior of valve-stem 116, from where the fluid will flow into the recess 122. After the fluid has reached the recess 122 above piston 121 it flows through passages 160 and 161 against the valve 163, lifting this valve against gravity to establish a flow through the cross passage 162 into the compartment 61.

In case the upward movement of the body carrying frame 20 is accelerated a predetermined degree, a relative movement between the shock absorber casing 24 and the weight 66 obtains, causing the weight 66 to move the arm 63 clockwise about its pivotal support 62 whereby contact block 65 will engage valve 163 to urge it toward passage 161 and restrict the fluid flow therefrom. This restriction causes a pressure build-up within the recess 122, resulting in a downward movement of the piston 121 and its valve-stem 116, causing the fluid flow through valve-seat member 112 to be restricted and consequently resisting the movement of the piston 30 toward the right.

Thus it may be seen that, in response to accelerations in the movement of the body-carrying frame member 20 the weight 66 will act to restrict fluid flows, which restriction causes adjustments of the main fluid flow control devices, resulting in a similar restriction to the main fluid flows. This restriction to the main fluid flows will increase the effective resistance of the shock absorber to relative movements between the body carrying frame and the axle 21 of the vehicle proportionately with the accelerations in the movement of said body carrying frame 20. From the aforegoing description of the main fluid flow control devices which include valve stems 91 and 116 respectively, it will be noted that they may properly be termed "multiplying valves", for in each the comparatively lower pressure acting upon the respective piston heads 93 and 121 and regulated by the inertia weight actuated valves 154 and 163 respectively, may actuate said valves to restrict a higher pressure acting upon the ends 90 and 112 of the valve stems 91 and 116 respectively.

If the operator finds that the resistance offered by the shock absorber is too great, then he moves the link 78 connected with lever 76 to rotate plug 75 so that one or more of the passages 71, 72, and 73 are closed. This increases the resistance to the escape of fluid from beneath the dashpot piston 69 attached to the weight 66 and consequently increases the retarding effect of the dashpot to the weight movement, thereby requiring a greater acceleration in the movement of the body carrying frame before it becomes effective to increase the control over the main fluid flow. If, on the other hand, the operator desires a greater resistance by the shock absorber to body movements, then he moves the lever 76 so that more of the passages 70, 72 or 73 are uncovered, increasing the fluid flow capacity between the space beneath the dashpot piston 69 and the exhaust passage 74, thus permitting a freer movement of the weight 66. Such an adjustment will permit the weight to become effective to increase the resistance at comparatively lesser accelerations in the movement of the body carrying frame 20 and thus the shock absorber will be adjusted to offer a greater resistance to such frame movements.

Applicant has thus provided a shock absorber adapted automatically to adjust itself proportionately with the accelerations in the vertical movements of the body carrying frame 20. He has also provided a manual control which may be actuated by the operator as he drives the vehicle for purposes of increasing or decreasing the effective resistance offered by the shock absorber against such body movements.

While the embodiment of the present invention constitutes a preferred form, it is to be understood that other forms might be adopted, all coming within the scope of the claims which follow.

What is claimed is as follows:

1. A hydraulic shock absorber comprising, in combination, a casing providing a fluid displacement chamber; fluid pressure actuated means for controlling the flow of fluid from said chamber; inertia mass controlled means for regulating fluid flow to vary the controlling effect of the aforementioned means; and manually adjustable means for varying the effect of the inertia mass controlled means.

2. A hydraulic shock absorber having means for circulating a fluid; fluid pressure actuated means for controlling said fluid circulation; an inertia mass controlled means for regulating the fluid pressure to vary the regulatory effect of the first mentioned means; means for retarding the operation of the inertia mass controlled means; and a manually adjustable member for varying the effect of the retarding means.

3. A hydraulic shock absorber having means for circulating a fluid; a valve adapted to be actuated by fluid pressure in either direction for controlling said fluid circulation; means adapted to control fluid flow for adjusting said valve to vary its effect; an inertia weight for actuating said means; means for retarding the movements of the inertia weight; and a manually adjustable member for varying the retarding effect of the last mentioned means.

4. A hydraulic shock absorber having means for circulating fluid; inertia mass controlled means including a fluid pressure multiplying valve for regulating said fluid circulation; and a manually adjustable governor for varying the effect of said inertia mass controlled means.

5. A hydraulic shock absorber having means for circulating fluid; an inertia mass regulated fluid flow control device including a fluid pressure multiplying valve for controlling said fluid circulation; a hydraulic governor for retarding the operation of the device and manual means for varying the retarding effect of said hydraulic governor.

6. A hydraulic shock absorber having means for circulating fluid; inertia mass controlled means including a valve adapted to be operated in either direction by fluid pressure for regulating said fluid circulation; a dashpot for retarding the operation of the inertia mass controlled means; and manual means for varying the retarding effect of the dashpot.

7. A hydraulic shock absorber having means for circulating fluid; a valve adapted to be actuated by fluid pressure to permit said fluid circulation; a second valve actuated by an inertia weight for adjusting the first mentioned valve to vary its control of the fluid flow; means for retarding the movement of the inertia weight; and a manually adjustable member for varying the effect of the retarding means.

8. A hydraulic shock absorber having means for circulating fluid; a spring loaded valve adapted to be actuated by fluid pressure to provide two paths of fluid flow; an inertia weight actuated valve adapted to regulate the fluid flow in one of said paths to adjust the spring loaded valve to vary the fluid flow in the other path; and manually adjustable means for varying the effect of the inertia weight actuated valve.

9. A hydraulic shock absorber having means for circulating fluid; a pressure release valve adapted to permit fluid circulation through two paths in response to fluid pressure; means for restricting the fluid flow through one of said paths; an inertia mass actuated valve for regulating the fluid flow through the other path to effect adjustment of the pressure release valve; and a manually adjustable governor for controlling the operation of the inertia mass actuated valve.

10. A hydraulic shock absorber having means for circulating fluid; a spring-loaded valve adapted to be actuated by fluid pressure to permit fluid circulation through two paths; a spring loaded valve for restricting the fluid flow through one of said paths; means on said first valve adapted to be actuated by fluid pressure to adjust said valve to vary its restriction to fluid flow; a valve for controlling the fluid flow through the other of said paths; an inertia weight for actuating said last mentioned valve; a governor for controlling the movements of the inertia weight; and manual means for regulating the governor.

11. A hydraulic shock absorber having means for circulating a fluid; fluid flow control devices for regulating said fluid circulation, certain of said devices being actuated by fluid pressure in either direction and another by an inertia weight;

a hydraulic governor connected with the weight for controlling its movements in both directions; and a manually adjustable valve for regulating the flow of fluid of the governor to vary its effect upon the inertia weight movements.

12. A hydraulic shock absorber having means for circulating a fluid; a valve actuated by fluid pressure in either direction for regulating said fluid circulation; a check valve for controlling the fluid flow that actuates the first mentioned valve in one direction; an inertia weight for actuating said check valve; a hydraulic dashpot for retarding the movement of the inertia weight in either direction, the movable member of said dashpot is connected to the weight; and a manually adjustable valve for controlling the flow of fluid into and out of the dashpot to vary the operation of the weight.

13. A hydraulic shock absorber having means for circulating a fluid; means normally preventing fluid circulation but actuated by fluid pressure to permit circulation and also to increase its restriction to fluid flow; means actuated in response to accelerations in the movements of the shock absorber vertically to vary the effect of said first mentioned means; a governor for retarding the movements of the last mentioned means; and a manually adjustable member for varying the retarding effect of the governor.

14. A hydraulic shock absorber having means for circulating a fluid; means including a valve adapted to be actuated in either direction by fluid pressure and an inertia weight actuated valve for restricting said fluid circulation in response and proportionately to accelerations in the vertical movements of the shock absorber; a governor for regulating said means; and a manually adjustable member for varying the effect of the governor upon said means.

15. A hydraulic shock absorber having means for circulating a fluid; means including a valve adapted to be actuated in either direction by fluid pressure for controlling said fluid circulation; inertia means adapted to vary the controlling effect of the aforementioned means in response to and proportionately with accelerations in the movements of the shock absorber; a governor for said inertia means; and a manually operated means for controlling the governor to vary its regulating effect upon the inertia means.

FREDERICK D. FUNSTON.